Patented Mar. 21, 1939

2,151,398

UNITED STATES PATENT OFFICE

2,151,398

METHOD OF PRODUCING AIR FOAM

Adolf Weissenborn, Hamburg, Germany, assignor to the firm Fabrik Chemischer Praeparate Von Dr. Richard Sthamer, Hamburg-Billbrook, Germany No Drawing. Application July 6, 1937, Serial No. 152,241. In Germany July 6, 1936

3 Claims. (Cl. 23—11)

This invention relates to a method of producing air-foam for technical purposes, particularly for fire-extinguishing purposes.

The advantages of air-foam, particularly for use for fire-extinguishing purposes as compared with chemically produced foam have heretofore been partly counter-balanced by the drawback that air-foam does not persist as long and does not have as good covering and adhesive properties as chemically produced foam. The present invention overcomes this drawback in that it permits of the production of a good and long persisting air-foam.

According to the invention, there are employed, as foam-forming agents, proteins which have been dissociated or degradated in known manner. (Prior disclosures of how to prepare dissociated proteins may be found, for instance, in Abderhalden: Handbuch d. biologischen Arbeitsmethoden, Abt. I. Teil, p. 3, "Allgemeine Technik und Isolierung der Mono-Aminsäuren"; Ullmann (1929): Enzyklopadie d. techn. Chemie, II Aufl., Bd. 4, p. 350, and references given therein; and Krafft: Lehrbuch der organ. Chemie, 1897, II Aufl., p. 544.) By dissociated or degradated proteins are understood here such proteins—of animal or vegetable origin—which have been acted upon by acids or alkalis such as sulphuric acid or ammonia and which have been made thereby soluble in water. As is well known, degradation of an organic compound or molecule involves the separation of part of the compound or molecule and the formation of relatively less complex products. The protein molecules of the dissociated or degradated proteins, above referred to, are therefore different in structure from the original protein molecules, since a portion thereof— probably nitrogen—has been separated therefrom. The invention consists broadly in the use of such dissociated proteins in combination with salts of metals of poly- or variable valency, particularly of a low degree of oxidation. As proteins there may be employed for example fish flour or yeast. As metals there may be employed for example iron in the form of ferrous sulphate or chromium as chromium sulphate etc. Preferably there is produced a solution of the dissociated water-soluble proteins and for example ferrous sulphate, and from this solution foam is mechanically generated. The invention thus involves the combination of a chemical with a mechanical foam-producing operation.

In contradistinction to a known proposal which provides for the use of glue and of ferrous sulphate for producing a foam for special purposes, the dissociated proteins used according to the invention give a pure or real solution and not a colloidal solution which is obtained when employing glue. Such pure or real solution may be rendered clear as water by suitable filtration which is a decided advantage, because it prevents the forming of sediments in the solution when kept ready for use for a length of time.

The air-foam obtained by the invention is not only equivalent to chemical foam but excels the latter in persistency as it endures for several days. For example, the metal salt may be previously mixed with the proteins or the metal salt can be added to the proteins at the moment when the foam is to be produced. In this connection it has been found that on bringing together the dissolved dissociated proteins and compound of divalent iron there are obtained clear solutions while on oxidation of the ferrous salt to form the ferric salt there are separated out water-insoluble solids which presumably constitute the insoluble ferric salt of the amido acids present.

If a mixture of dissolved protein in the presence of a dissolved metal salt, for example, a ferrous salt, be converted in known manner mechanically into air-foam, the oxygen of the air in the interior of the individual bubbles effects oxidation of the iron content in the walls of the bubbles. The aforesaid separation of the water-insoluble solids is effected so that there is formed a skeleton structure for the bubbles which offers an extraordinary resistance to breakdown.

With the choice of the correct proportions there may be obtained a foam which dries in its original form and which can only be destroyed by mechanical influences.

Example 250 grams of dissociated water-soluble protein and 15 grams of ferrous sulphate are dissolved in 100 litres of water and brought mechanically to a condition of foam. There is hereby obtained a foam which persists for many hours.

With higher concentration the production of foam is effected more readily. The foam so obtained retains its form even after having become dry.

There may be used, in lower stages of oxidation, any metals of poly- or variable valency which produce with dissociated proteins water-insoluble bodies in oxidised form capable of forming a skeleton structure for reinforcing the bubbles.

Instead of the oxygen of the air naturally also other gases containing oxygen may be used.

I claim:

1. A method of producing air foam comprising dissolving a degradated protein and a salt of a polyvalent metal in a lower state of oxidation in water and converting the solution into foam in presence of an oxygeniferous gas.

2. The method claimed in claim 1 in which the metal salt is a ferrous salt.

3. The method claimed in claim 1 in which the metal salt is ferrous sulphate.

ADOLF WEISSENBORN.